(12) United States Patent
Labs et al.

(10) Patent No.: US 7,352,778 B2
(45) Date of Patent: Apr. 1, 2008

(54) SYNCHRONIZING METHOD AND APPARATUS

(75) Inventors: Jonathan F. Labs, Montreal (CA); Greg Beaton, Lachine (CA); Erick Delage, Beaconsfield (CA); René Janicek, Verdun (CA); Jean-François Lacasse, Ville de Lorraine (CA); Rainer Ullmann, Pointe-Claire (CA)

(73) Assignee: Wavesat Wireless Inc., Dorval, Québec (CA)

( * ) Notice: Subject to any disclaimer, the term of this patent is extended or adjusted under 35 U.S.C. 154(b) by 1009 days.

(21) Appl. No.: 10/601,534

(22) Filed: Jun. 24, 2003

(65) Prior Publication Data

US 2004/0264510 A1 Dec. 30, 2004

(51) Int. Cl.
*H04J 3/06* (2006.01)
(52) U.S. Cl. ..................................... 370/503
(58) Field of Classification Search ............ None
See application file for complete search history.

(56) References Cited

U.S. PATENT DOCUMENTS

| | | | |
|---|---|---|---|
| 6,385,232 B1 * | 5/2002 | Terashima | 375/149 |
| 6,493,360 B1 * | 12/2002 | Nishimura | 370/514 |
| 6,704,374 B1 * | 3/2004 | Belotserkovsky et al. | 375/326 |
| 2004/0076246 A1 * | 4/2004 | Vanderperren et al. | 375/343 |

OTHER PUBLICATIONS

A technique for Orthogonal Frequency Division Multiplexing Frequency Offset Correction, by Paul H. Moose, IEEE Transactions on Communications, vol. 42, No. 10, Oct. 1994, pp. 2908-2914.
An Introduction to Digital Modulation and OFDM Techniques, M.C.D. Maddocks, Research Dept. Engineering Division, The British Broadcasting Corporation, 1993, pp. 1-10.
The How and Why of COFDM, by J. H. Stott, BBC Research and Development, Winter 1998, pp. 1-14.
Timing and Frequency Synchronization of OFDM Systems Using the Cyclic Prefix, by Magnus Sandell et al., In Proceedings of International Symposium on Synchronization, Essen, Germany, Dec. 1995, pp. 16-19.
OFDM for Wireless Multimedia Communications, R.D. Van Nee et al., Artech House, Boston, MA 2000, pp. 80-88.

* cited by examiner

*Primary Examiner*—Doris H. To
*Assistant Examiner*—Kerri M Rose
(74) *Attorney, Agent, or Firm*—Bereskin and Parr

(57) ABSTRACT

A method and apparatus is disclosed for performing a synchronization of an incoming series of complex samples of an incoming signal with a known sequence of a plurality of coefficients which represents a pattern within the incoming signal, known to the synchronizer, where the synchronization is performed using a plurality of cross-correlations units.

13 Claims, 7 Drawing Sheets

SYNCHRONIZING METHOD AND APPARATUS

CROSS-REFERENCE TO RELATED APPLICATIONS

This is the first application filed for the present invention.

TECHNICAL FIELD

This invention relates to the field of telecommunications. More precisely, this invention pertains to a method and apparatus for synchronizing a burst or a packet transmission signal.

BACKGROUND OF THE INVENTION

In Orthogonal Frequency Division Multiplexing (OFDM), various methods are known and used for performing a synchronization of a signal with a known sequence.

For packet transmission, such as in wireless LAN IEEE 802.11 systems or broadband wireless access IEEE 802.16a systems, an efficient method involves transmitting particular OFDM symbols which are known to a receiver.

Now referring to FIG. 1, there is shown an embodiment of a prior art synchronizer. The synchronizer performs a synchronization of an incoming series of complex samples of an incoming signal with a known sequence of a plurality of coefficients $Co \ldots Cn$ which represent a pattern within the incoming signal, known to the synchronizer.

The prior art synchronizer comprises a plurality of delay units 10, a plurality of multipliers 12, an adding unit 14 and a maximum finding unit 16.

Each delay unit 10 of the plurality of delay units 10 delays a corresponding incoming series of complex samples of the incoming signal by a fixed delay.

Each multiplier 12 of the plurality of multipliers 12 multiplies a corresponding signal with a corresponding coefficient of the sequence of the plurality of coefficients to provide a corresponding multiplied signal.

The adding unit 14 receives each of the multiplied signals and provides an added signal which is equal to the sum of each of the multiplied signals.

The maximum finding unit 16 receives the added signal and provides a synchronization signal when the added signal satisfies criteria for identifying a maximum.

Someone skilled in the art will appreciate that the maximum value signal is outputted in the case where the incoming input signal matches the sequence of the plurality of coefficients.

Unfortunately, as will be appreciated by someone skilled in the art, such embodiments may be dependent on various parameters which may affect ultimately the maximum value signal provided by the maximum finding unit 16. For instance, the signal may be affected by noise or the amplitude of the signal may be attenuated.

It will also be appreciated by the skilled addressee that a multiplier of the plurality of multipliers 12 is costly to implement in hardware, especially in the case of a Field Programmable Gate Array (FPGA) or in the case of an Application Specific Integrated Circuit (ASIC).

In view of the above, there is a need for a method and apparatus that will overcome the above-identified drawbacks and that will further be less complex to implement.

SUMMARY OF THE INVENTION

It is an object of the invention to provide a method for synchronizing a burst with a known sequence of at least one coefficient.

Yet another object of the invention is to provide an apparatus for synchronizing a burst with a known sequence of at least one coefficient.

According to a first aspect of the invention, there is provided, in a communication device, a method of synchronizing at least one known coefficient to a transmitted signal having an arbitrary power value, the method comprising determining a quantization bit indicative of the arbitrary power value, correlating the quantization bit with the at least one known coefficient to obtain a correlated signal, selecting the correlated signal when the correlated signal matches a given criterion, synchronizing the transmitted signal with the at least one known coefficient using the selected correlated signal.

According to another aspect of the invention, there is provided, in a communication device, a synchronizer for synchronizing a known sequence of coefficients, the sequence of coefficients having a real part and an imaginary part, to an incoming input signal, the incoming input signal having a real part and an imaginary part, comprising a first correlation unit correlating the imaginary part of the incoming input signal with the imaginary part of the sequence of at least one coefficient to provide a first correlated signal, a second correlation unit correlating the real part of the incoming input signal with the real part of the sequence of at least one coefficient to provide a second correlated signal, a third correlation unit correlating the imaginary part of the incoming input signal with the real part of the sequence of at least one coefficient to provide a third correlated signal, a fourth correlation unit correlating the real part of the incoming input signal with the imaginary part of the sequence of at least one coefficient to provide a fourth correlated signal, a first adding unit subtracting the first correlated signal and the second correlated signal to "4" to provide a first added signal, a second adding unit subtracting the third correlated signal and adding the fourth correlated signal to provide a second added signal and a criterion matching unit determining which of the first added signal and the second added signal matches a given criterion.

According to another aspect of the invention, there is provided, in a communication system, a synchronizer for determining when a transmitted signal, having an arbitrary power value, matches at least one known coefficient, the synchronizer comprising a quantizer determining a quantization bit indicative of the arbitrary power value, a correlator to correlate the quantization bit with the at least one known coefficient to obtain a correlated signal, a selector to select the correlated signal when the correlated signal matches a given criterion.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 3:
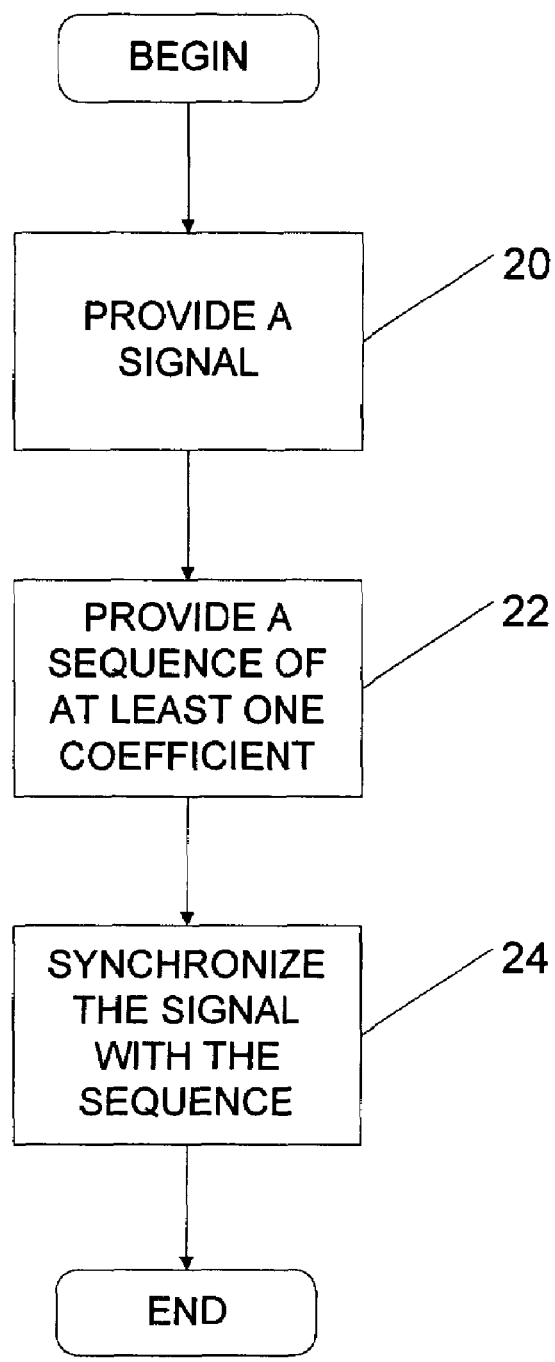
FIG. 3 is a flowchart which shows the preferred embodiment of the invention; according to a first step, an incoming input signal is provided, a sequence of at least one coefficient is then provided and the incoming input signal provided is synchronized with the sequence of at least one coefficient.

Now referring to FIG. 3, there is shown how the synchronizer 17 operates in the preferred embodiment of the invention.

According to step 20, an incoming input signal to synchronize with a sequence of at least one coefficient is provided to the synchronizer.

According to step 22, the sequence of at least one coefficient is provided to the synchronizer 17.

According to step 24, the provided incoming input signal is synchronized with the provided sequence of at least one coefficient.

Figure 4:
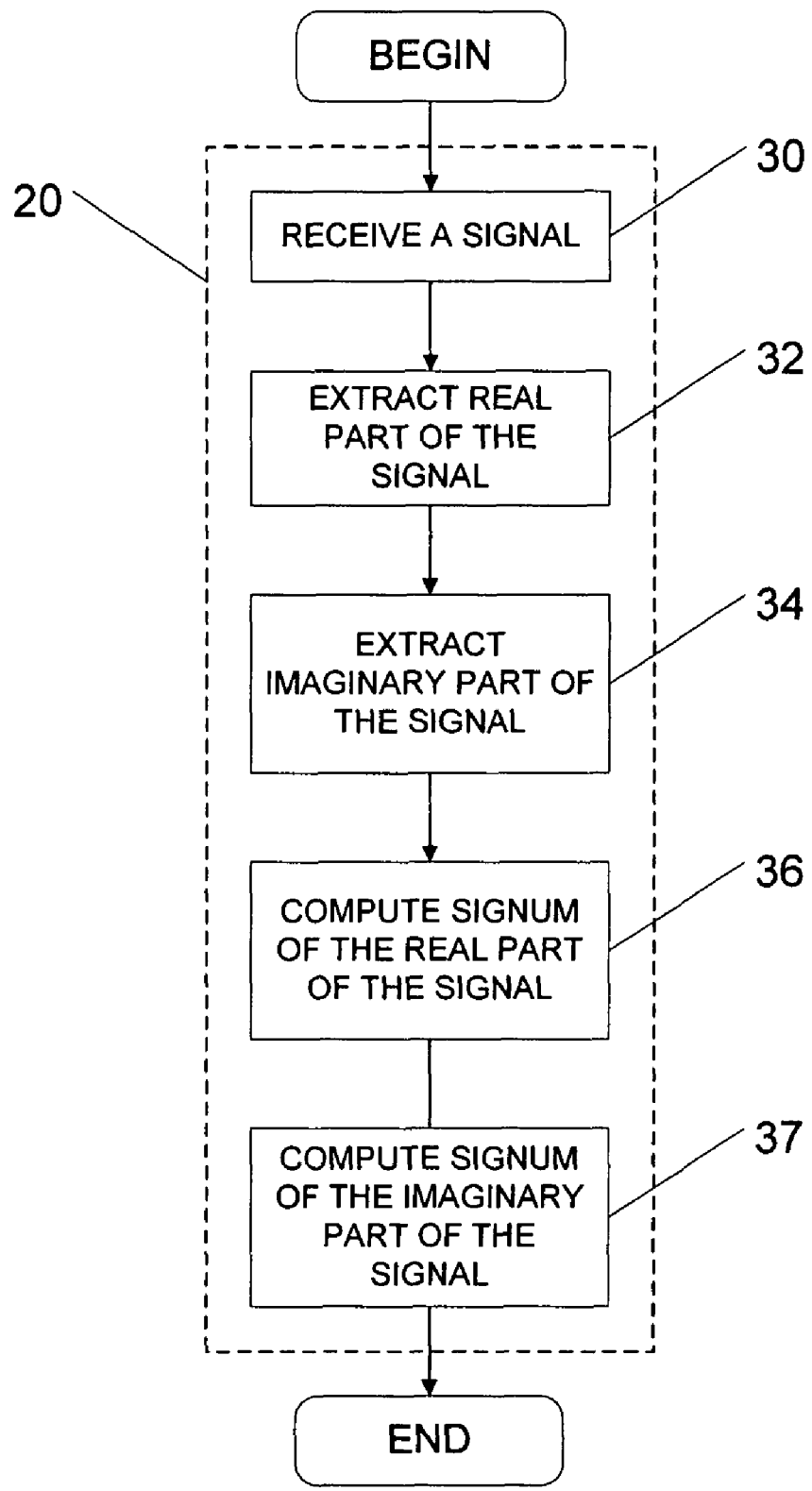
FIG. 4 is a flowchart which shows how the incoming input signal is provided.

Now referring to FIG. 4, there is shown how the signal to synchronize, according to step 20, is provided in one embodiment of the invention.

According to step 30, the incoming input signal is received by the synchronizer. In the preferred embodiment of the invention, the incoming input signal comprises a real part and an imaginary part.

According to step 32, the real part of the incoming input signal is extracted.

According to step 34, the imaginary part of the incoming input signal is extracted.

According to step 36, signum of the extracted real part of the incoming input signal is computed.

While someone skilled in the art will appreciate that signum (Sgn( )) function is usually defined as follows for a function f:

Sgn($f$)=1 if $f$>0;

Sgn($f$)=0 if $f$=0; and

Sgn(f)=−1 if f<0, it will be appreciated in the following that the signum function used in the preferred embodiment described herein is defined as follows:

Sgn($f$)=1 if $f \geq 0$;

Sgn($f$)=−1 if $f<0$.

According to step 37, signum of the extracted imaginary part of the incoming input signal is computed.

Figure 5:
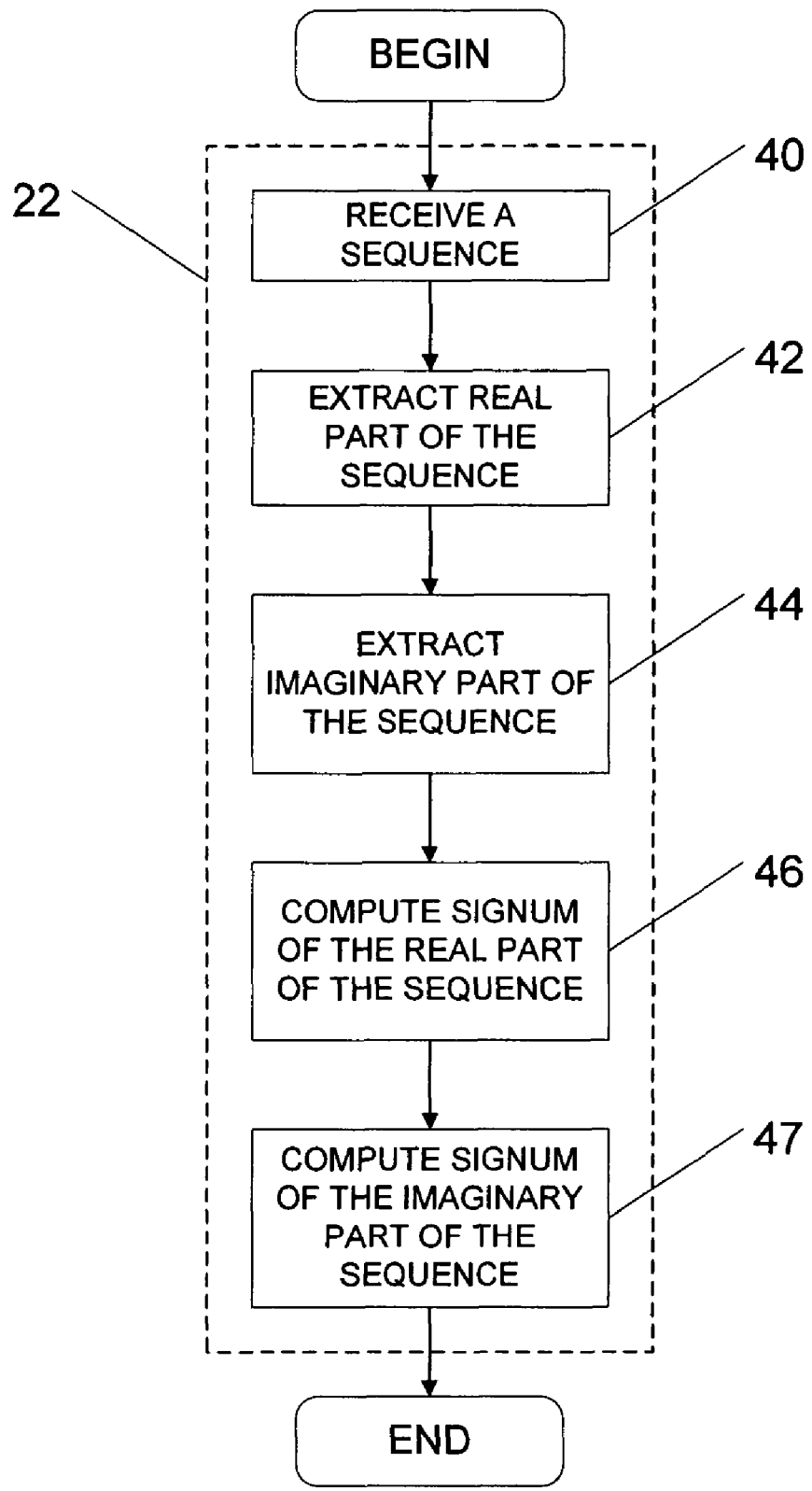
FIG. 5 is a flowchart which shows how the sequence of at least one coefficient is provided.

Now referring to FIG. 5, there is shown how the sequence of at least one coefficient is provided according to step 22.

According to step 40, the sequence of at least one coefficient is received by the synchronizer. In the preferred embodiment of the invention, the sequence of at least one coefficient comprises a real part and an imaginary part.

According to step 42, the real part of the sequence of at least one coefficient is extracted.

According to step 44, the imaginary part of the sequence of at least one coefficient is extracted.

According to step 46, signum of the extracted real part of the sequence of at least one coefficient is computed.

According to step 47, signum of the extracted imaginary part of the sequence of at least one coefficient is computed.

Figure 6:
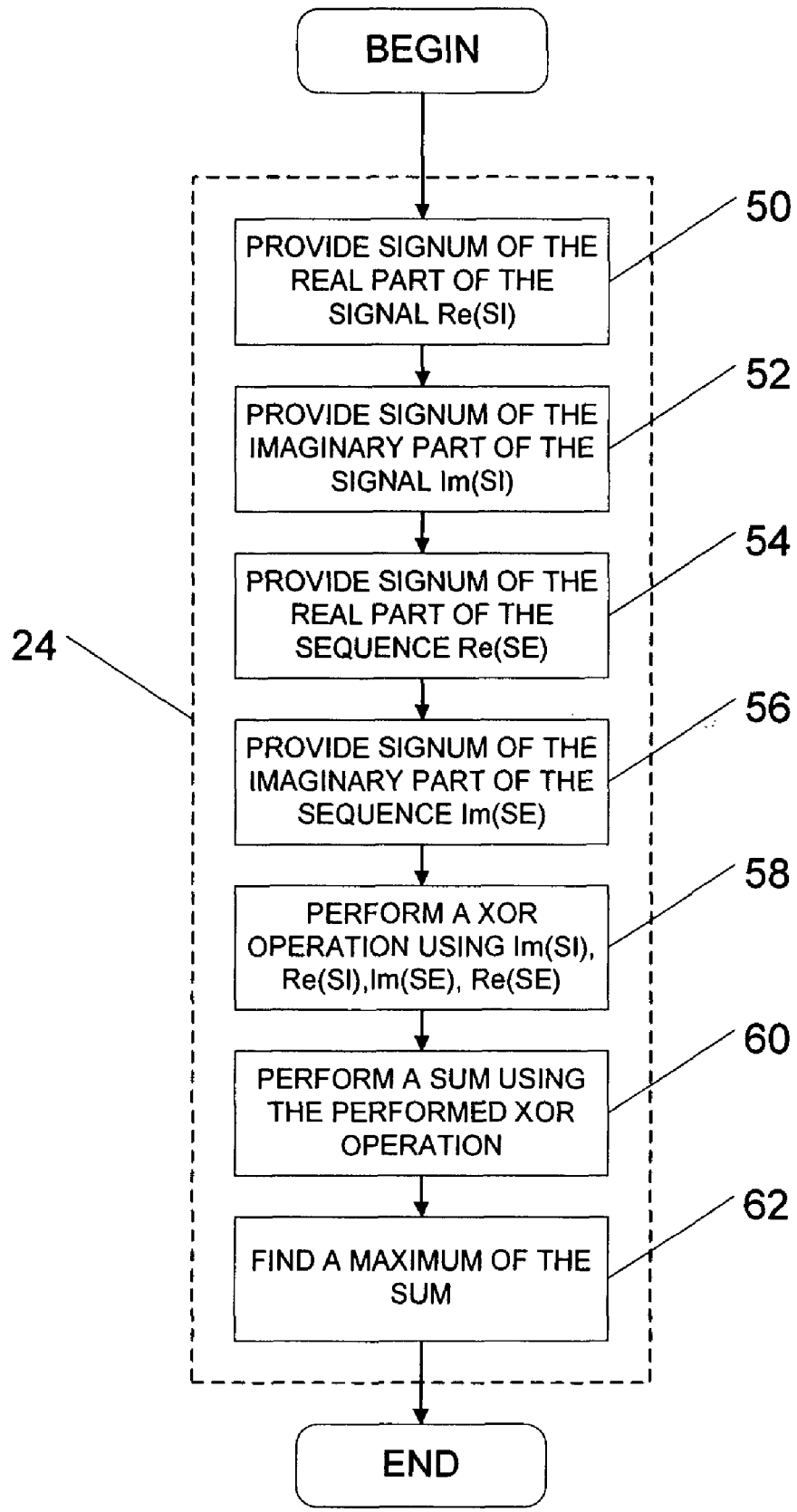
FIG. 6 is a flowchart which shows how synchronization is achieved between the incoming input signal and the sequence of at least one coefficient in the preferred embodiment of the invention.

Now referring to FIG. 6, there is shown how the synchronization is achieved between the provided incoming input signal and the sequence of at least one coefficient according to step 24 in the preferred embodiment of the invention.

According to step 50, a mapped signum of the real part of the incoming input signal is provided. In fact, the signum of the real part of the incoming input signal, which is computed according to step 36, is mapped. Preferably, the signum of the real part of the incoming input signal is mapped in order to be located at 0 and 1 rather than to be located at −1 and 1.

According to step 52, a mapped signum of the imaginary part of the incoming input signal is provided. The signum of the imaginary part of the incoming input signal, which is computed according to step 37, is mapped. Preferably, the signum of the imaginary part of the incoming input signal is mapped in order to be located at 0 and 1 rather than to be located at −1 and 1.

According to step 54, a mapped signum of the real part of the sequence of at least one coefficient is provided. The signum of the real part of the sequence of at least one coefficient, which is computed according to step 46, is mapped. Preferably, the signum of the real part of the sequence of at least one coefficient is mapped in order to be located at 0 and 1 rather than to be located at −1 and 1.

According to step 56, a mapped signum of the imaginary part of the sequence of at least one coefficient is provided. The signum of the imaginary part of the sequence of at least one coefficient, which is computed according to step 47, is mapped. Preferably, the signum of the imaginary part of the sequence of at least one coefficient is mapped in order to be located at 0 and 1 rather than to be located at −1 and 1.

According to step 58, an exclusive or (XOR) operation is performed using the mapped signum of the real part of the signal, the mapped signum of the imaginary part of the signal, the mapped signum of the real part of the sequence of at least one coefficient and the mapped signum of the imaginary part of the sequence of at least one coefficient. A cross-correlated result signal is provided upon completion of the exclusive or (XOR) operation.

Someone skilled in the art will appreciate that such exclusive or (XOR) operation is of great advantage as it is very easy to implement in hardware.

According to step 60, a sum is computed using the result of the exclusive or (XOR) operation performed in step 58.

According to step 62, a maximum in the cross-correlated signal is located using the result of the sum computed according to step 60. In the preferred embodiment, the maximum is located by detecting the maximum of p=y*(n)·y(n), where y(n) is the cross-correlated signal.

It will be appreciated that detecting the maximum in the cross correlated signal is a specific case of a more general embodiment where step 62 is achieved when the cross-correlated signal matches a given criterion. Such given criterion may be provided depending on an application. In fact, it will be appreciated that in the case where some noise is added to the signal, finding the maximum may not be reliable. Alternatively, the given criterion may be defined using statistical parameters for instance.

Figure 1:
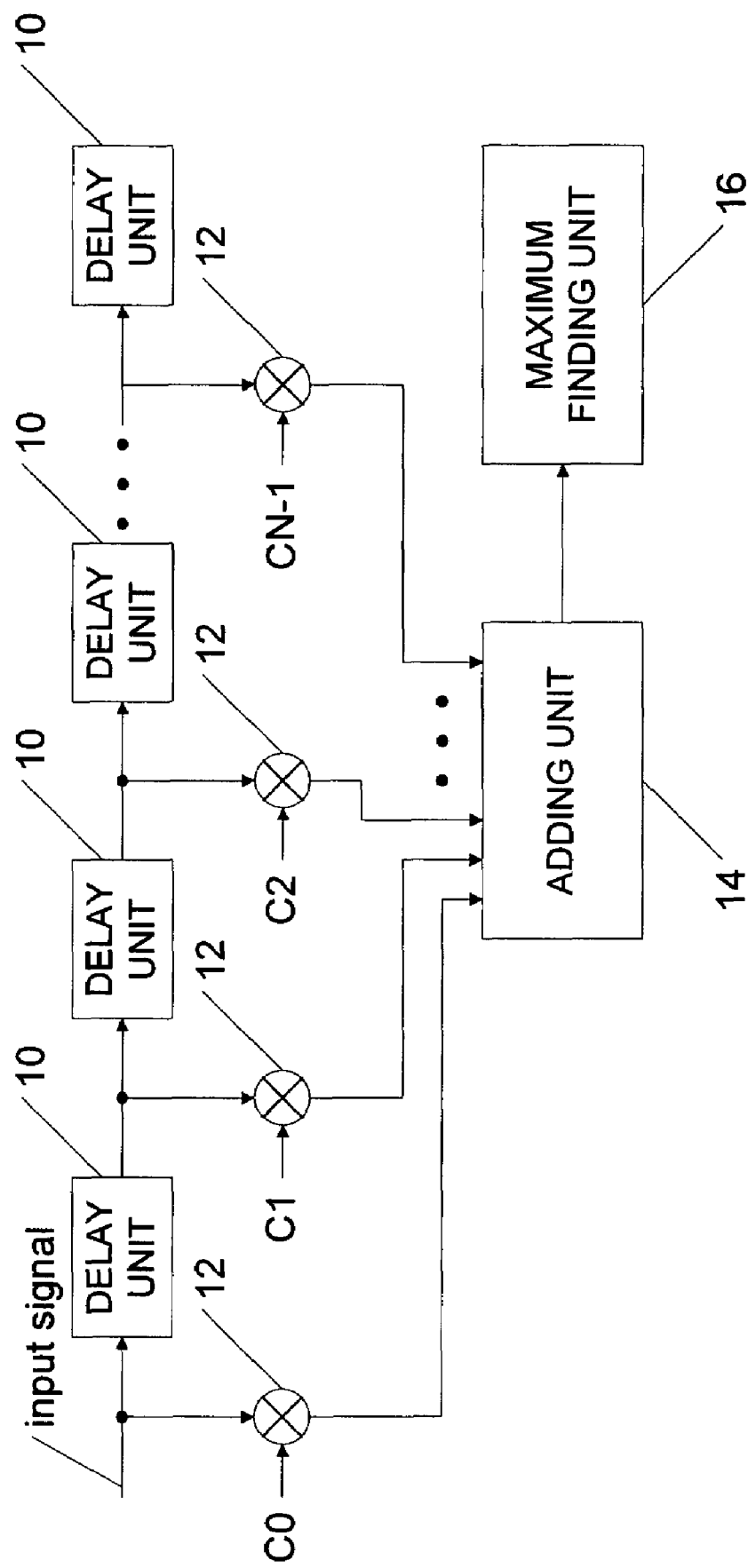
FIG. 1 is a schematic which shows a prior art synchronizer.
Figure 2:
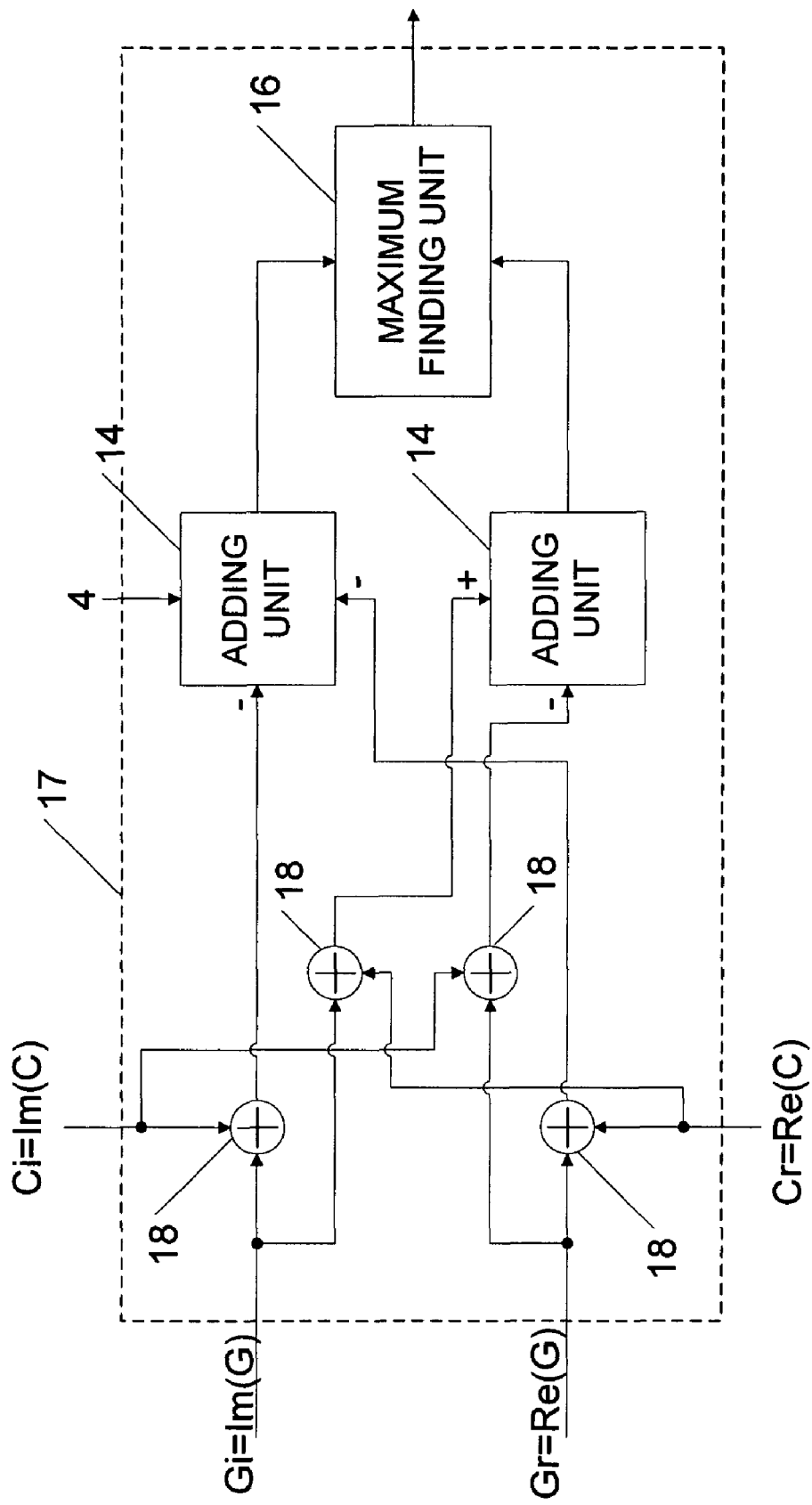
FIG. 2 is a schematic which shows a synchronizer which performs a synchronization of an incoming input signal with a sequence of at least one coefficient according to the preferred embodiment of the invention.

Now referring to FIG. 2, there is shown a synchronizer 17 in one embodiment of the invention.

In this embodiment, an incoming input signal G, having an arbitrary power value, is provided to the synchronizer. The incoming input signal G comprises a real part Re(G) and an imaginary part Im(G).

The synchronizer 17 synchronizes the incoming input signal G with a sequence of at least one coefficient C. In this embodiment, the sequence comprises one coefficient. The sequence of at least one coefficient comprises a real part Re(C) and an imaginary part Im(C).

The synchronizer 17 comprises a first correlation unit 18 which correlates the imaginary part of the incoming input signal Im(G) with the imaginary part of the sequence of at least one coefficient Im(C) to provide a first correlated signal.

The synchronizer 17 comprises a second correlation unit 18 which correlates the real part of the incoming input signal Re(G) with the real part of the sequence of at least one coefficient Re(C) to provide a second correlated signal.

The synchronizer 17 comprises a third correlation unit 18 which correlates the imaginary part of the incoming input signal Im(G) with the real part of the sequence of at least one coefficient Re(C) to provide a third correlated signal.

The synchronizer 17 comprises a fourth correlation unit 18 which correlates the real part of the incoming input signal Re(G) with the imaginary part of the sequence of at least one coefficient Im(C) to provide a fourth correlated signal.

The synchronizer 17 further comprises a first adding unit 14. The first adding unit 14 subtracts the first correlated signal and the second correlated signal to 4 to provide a first added signal.

The synchronizer 17 further comprises a second adding unit 14. The second adding unit 14 subtracts the third correlated signal and adds the fourth correlated signal to provide a second added signal.

The synchronizer 17 further comprises the maximum finding unit 16 which determines which of the first added signal and the second added signal provides a maximum value. Someone skilled in the art will appreciate that it is then possible to synchronize the incoming input signal G with the sequence of at least one coefficient C when the maximum value is located according to step 62 of FIG. 6. It will further be appreciated that the maximum finding unit 16 is a specific case of a criterion matching unit.

Figure 7:
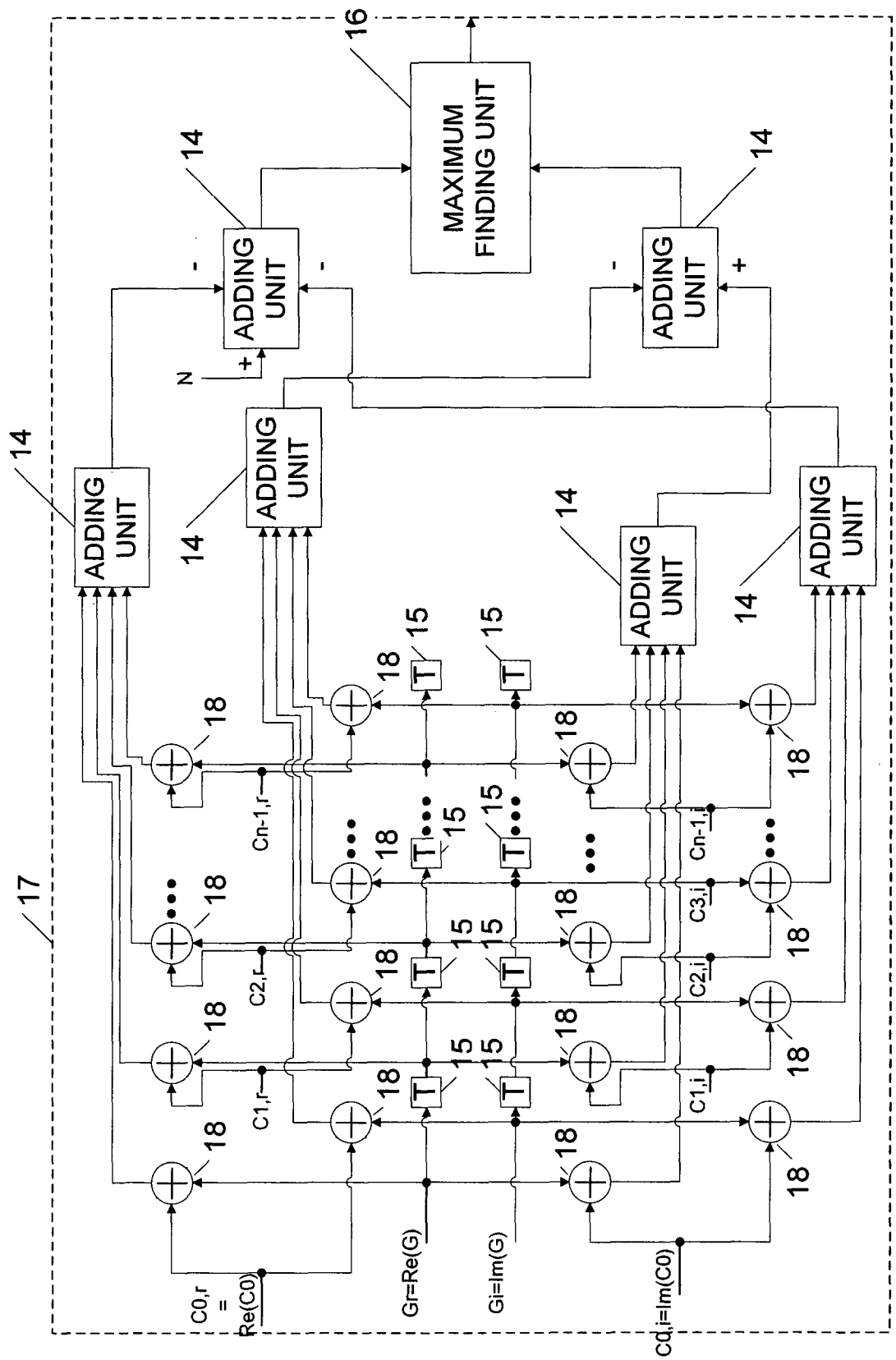
FIG. 7 is a schematic which shows a synchronizer which performs a synchronization of an incoming input signal with a sequence of a plurality of coefficients according to the preferred embodiment of the invention.

Now referring to FIG. 7, there is shown a schematic of a synchronizer which performs a synchronization of an incoming input signal with a sequence of a plurality of coefficients according to the preferred embodiment of the invention.

The synchronizer comprises a plurality of correlation units 18, a plurality of delay units 15, a plurality of adding units 14 and a maximum finding unit 16.

The plurality of correlation units 18, the plurality of adding units 14 and the maximum finding unit 16 function in the same manner as described with FIG. 2.

Each delay unit of the plurality of delay units 15 is used to delay an incoming signal by a predetermined delay.

The result of a cross-correlation of the sequence of a plurality of coefficients with the incoming input signal is $$y(n) = \sum_{i=0}^{N-1} c(i)^* * g(i+n)$$

$$= \sum_{i=0}^{N-1} [\text{Re}\{c(i)\}\text{Re}\{g(i+n)\} + \text{Im}\{c(i)\}\text{Im}\{g(i+n)\}] +$$

$$j\sum_{i=0}^{N-1} [\text{Re}\{c(i)\}\text{Im}\{g(i+n)\} - \text{Im}\{c(i)\}\text{Re}\{g(i+n)\}],$$

where c(i) are the plurality of complex coefficients, g(i) are complex samples of the incoming input signal, N is the number of coefficients of the sequence, i is the coefficient index and n is the sample index.

A signum of the last equation provides that $$y(n) = \sum_{i=0}^{N-1} [\text{sign}\{\text{Re}\{c(i)\}\}\text{sign}\{\text{Re}\{g(i+n)\}\} +$$

$$\text{sign}\{\text{Im}\{c(i)\}\}\text{sign}\{\text{Im}\{g(i+n)\}\}] +$$

$$j\sum_{i=0}^{N-1} [\text{sign}\{\text{Re}\{c(i)\}\}\text{sign}\{\text{Im}\{g(i+n)\}\} -$$

$$\text{sign}\{\text{Im}\{c(i)\}\}\text{sign}\{\text{Re}\{g(i+n)\}\}]$$

The last equation may be expressed as:

$$y(n) = \sum_{i=0}^{N-1} [m_{RR}(i,n) + m_{II}(i,n)] + j\sum_{i=0}^{N-1} [m_{RI}(i,n) - m_{IR}(i,n)],$$

where $m_{RR}(i, n) \equiv \text{sign}\{Re\{c(i)\}\}\text{sign}\{Re\{g(i+n)\}\}$ $m_{II}(i, n) \equiv \text{sign}\{Im\{c(i)\}\}\text{sign}\{Im\{g(i+n)\}\}$ $m_{RI}(i, n) \equiv \text{sign}\{Re\{c(i)\}\}\text{sign}\{Im\{g(i+n)\}\}$ $m_{IR}(i, n) \equiv \text{sign}\{Im\{c(i)\}\}\text{sign}\{Re\{g(i+n)\}\}$ A mapping is then performed in order to have a result of a signum being one of 0 and 1, rather than being one of −1 and 1. To achieve such result, it is necessary that:

$x_0 = 1 - 2x_n.$

With the expressions:

$b_{RR}(i, n) \equiv \dfrac{1 - m_{RR}(i, n)}{2}$ $b_{II}(i, n) \equiv \dfrac{1 - m_{II}(i, n)}{2}$ $b_{RI}(i, n) \equiv \dfrac{1 - m_{RI}(i, n)}{2}$, it is possible to show that $b_{IR}(i, n) \equiv \dfrac{1 - m_{IR}(i, n)}{2}$ -continued $$y(n) = \sum_{i=0}^{N-1} [1 - 2b_{RR} + 1 - 2b_{II}] + j \sum_{i=0}^{N-1} [1 - 2b_{RI} - (1 - 2b_{IR})]$$

$$= 2\sum_{i=0}^{N-1} [1 - b_{RR} - b_{II}] + 2j \sum_{i=0}^{N-1} [b_{IR} - b_{RI}]$$

$$= 2N - 2\sum_{i=0}^{N-1} b_{RR} - 2\sum_{i=0}^{N-1} b_{II} + 2j \left[ \sum_{i=0}^{N-1} b_{IR} - \sum_{i=0}^{N-1} b_{RI} \right]$$

which may be simplified as $$y(n) = N - \sum_{i=0}^{N-1} b_{RR} - \sum_{i=0}^{N-1} b_{II} + j \left[ \sum_{i=0}^{N-1} b_{IR} - \sum_{i=0}^{N-1} b_{RI} \right]$$

The above-identified formula is therefore implemented in FIG. 7.

Someone skilled in the art will appreciate that such embodiment enables performing exclusive-OR which is of great advantage as the exclusive-OR, performed in units 18 of FIGS. 2 and 7, is easy to implement in hardware. It will further be appreciated that only one bit is used for quantization. Such one-bit quantization is of great advantage as signum function is not dependent on the amplitude of the signal but rather on the sign value of the input power of the signal.

The maximum finding unit 16 operates by finding a peak in the amplitude or amplitude-squared component of y(n).

More precisely, the peak is equal to:

$$p(n) = y(n) \cdot y(n)^*$$

In one embodiment, the maximum finding unit 16 operates by finding a maximum which is located when the sequence of the plurality of coefficients C0 . . . Cn matches the coefficients in an input signal.

Alternatively, the maximum finding unit 16 operates using a given criterion. The given criterion may be a threshold for instance. The threshold is chosen such that the probability of providing a false maximum is minimized while at the same time the probability of missing a valid trigger is sufficiently low. These conditions require estimating the probability distribution functions for the false synchronization and for a valid synchronization where the signal is distorted due to various impairments.

The embodiments of the invention described above are intended to be exemplary only. The scope of the invention is therefore intended to be limited solely by the scope of the appended claims.

We claim:

1. A method of synchronizing an incoming signal, said method comprising:
   extracting a real part and an imaginary part of the incoming signal and a real part and an imaginary part of a sequence of at least one known coefficient;
   extracting a sign for each of the extracted real part and imaginary part of the incoming signal, and the extracted real part and imaginary part of the sequence of at least one coefficient;
   correlating said extracted sign of the extracted real part and imaginary part of the incoming signal and said extracted sign of the real part and imaginary part of the sequence of at least one coefficient to obtain a correlated signal;
   selecting said correlated signal when said correlated signal matches a given criterion; and
   synchronizing said incoming signal with said at least one known coefficient using said selected correlated signal wherein said extracting a sign comprises applying a signum function defined as sgn (f)=1 when f≧0 and sgn (f)=−1 when f<0.

2. The method as claimed in claim 1, further comprising mapping the extracted sign of the real and imaginary part of the incoming signal and the real and imaginary part of the at least one known coefficient equal to one of 0 and 1, and further wherein said correlating comprises correlating said mapped extracted sign of the real and imaginary part of the incoming signal with said at least one known coefficient to obtain said correlated signal.

3. The method as claimed in claim 1, wherein said correlating comprises using a XOR function.

4. The method as claimed in claim 1, wherein wherein said correlating is performed using at least said sequence of known coefficients to provide a plurality of correlated signals, further wherein said selecting comprises generating a value indicative of a synchronization between said sequence of known coefficients and said transmitted signal and selecting said correlated signals from said plurality of correlated signals when said synchronization indicative value matches said given criterion.

5. The method as claimed in claim 4, wherein said criterion is selected from a group consisting of the maximum value of said synchronization indicative value, a statistical function depending on said synchronization indicative value and a threshold value for said synchronization indicative value.

6. The method as claimed in claim 1, further comprising the step of providing said given criterion.

7. The method as claimed in claim 1, wherein said criterion is selected from a group consisting of the maximum value of said correlated signal, a statistical function depending on said correlated signal and a threshold value for said correlated signal.

8. A synchronizer for synchronizing a known sequence of coefficients, said sequence of coefficients having a real part and an imaginary part, to an incoming input signal, said incoming input signal having a real part and an imaginary part, the synchronizer comprising:
   a calculator for extracting a sign for each of the real part and imaginary part of the sequence of coefficients, and real part and imaginary part of the incoming input signal;
   a first correlation unit for correlating said sign of said imaginary part of said incoming input signal with said sign of said imaginary part of said sequence of at least one coefficient to provide a first correlated signal;
   a second correlation unit for correlating said sign of said real part of said incoming input signal with said sign of said real part of said sequence of at least one coefficient to provide a second correlated signal;
   a third correlation unit for correlating said sign of said imaginary part of said incoming input signal with said sign of said real part of said sequence of at least one coefficient to provide a third correlated signal;
   a fourth correlation unit for correlating said sign of said real part of said incoming input signal with said sign of said imaginary part of said sequence of at least one coefficient to provide a fourth correlated signal;
   a first adding unit subtracting said first correlated signal and said second correlated signal to "4" to provide a first added signal;

a second adding unit subtracting said third correlated signal and adding said fourth correlated signal to provide a second added signal; and a criterion matching unit determining which of said first added signal and said second added signal matches a given criterion.

9. A synchronizer for determining when an incoming signal, having an arbitrary power value, matches at least one known coefficient, said synchronizer comprising:

a quantizer determining a quantization bit indicative of said arbitrary power value, the quantizer applying a signum function to said arbitrary power value to obtain the quantization bit;

a correlator to correlate said quantization bit with said at least one known coefficient to obtain a correlated signal; and a selector to select said correlated signal when said correlated signal matches a given criterion.

10. The synchronizer as claimed in claim 9, wherein said quantizer comprises a calculator for applying a signum function to said arbitrary power value, said signum function being defined as sgn (f)=1 when f≧0 and sgn (f)=−1 when f<0.

11. The synchronizer as claimed in claim 10, wherein said quantizer further comprises a mapping unit to provide a mapped quantization bit equal to one of 0 and 1 after applying said signum function, further wherein said at least one known coefficient is equal either to one of 0 and 1 and further wherein said correlator correlates said mapped quantization bit with said at least one known coefficient to obtain said correlated signal.

12. The synchronizer as claimed in claim 9, wherein said at least one known coefficient comprises a sequence of known coefficients, further wherein said correlator correlates said sequence of known coefficients to provide a plurality of correlated signals, further wherein said selector generates a value indicative of a synchronization between said sequence of known coefficients and said incoming signal and further selects the correlated signals from said plurality of correlated signals when said synchronization indicative value matches said given criterion.

13. The synchronizer as claimed in claim 9, wherein at least one of said quantizer, said correlator and said selector is implemented in one of a Field Programmable Gate Array (FPGA) and an Application Specific Integrated Circuit (ASIC).

* * * * *